United States Patent
Yung et al.

(12) United States Patent (10) Patent No.: US 6,396,504 B1
(45) Date of Patent: *May 28, 2002

(54) GRAPHICAL IMAGE DATA REFORMATTING METHOD AND APPARATUS

(75) Inventors: Robert Yung, Fremont; Carlan Joseph Beheler, Foster City; Jaijiv Prabhakaran, Sunnyvale, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/674,278

(22) Filed: Jul. 1, 1996

Related U.S. Application Data (63) Continuation-in-part of application No. 08/236,572, filed on Apr. 29, 1994, now Pat. No. 5,734,874.

(51) Int. Cl.⁷ .................................................. G06T 11/00
(52) U.S. Cl. ........................................................ 345/589
(58) Field of Search ................................ 345/431, 433, 345/426, 429, 430, 432, 507, 509, 510, 515–517

(56) References Cited

U.S. PATENT DOCUMENTS

| 5,537,579 A | * 7/1996 | Hiroyuki ..................... 345/431 |
| 5,649,083 A | * 7/1997 | Barkans et al. ............. 345/431 |

FOREIGN PATENT DOCUMENTS

| EP | 2234096 A | 1/1991 | ............. G06F/5/00 |
| EP | WO 94/27211 | 11/1994 | ............. G06F/7/00 |
| EP | 0680013 A3 | 4/1997 | ............. G06T/1/20 |

\* cited by examiner

*Primary Examiner*—Almis R. Jankus
(74) *Attorney, Agent, or Firm*—Conley, Rose & Tayon (57) ABSTRACT

An image processor converts single-band pixel components, each of which represents a single band of a multiple-band pixel, to multiple-band pixels. A embodiment, a single read operation reads four single-band pixel components from each of three buffers which correspond to red, green, and blue bands, respectively, of a multiple-band graphical image. A single merge operation merges eight single-band pixel components representing alpha and green bands of four multiple-band pixels, and a single merge operation merges eight single-band pixel components representing blue and red bands of four multiple-band pixels. Two merge operations merge the respective merged data words to form four multiple-band pixels, each of which includes alpha, blue, green, and red components. The four multiple-band pixels are written to a destination buffer in four write operations.

21 Claims, 5 Drawing Sheets

GRAPHICAL IMAGE DATA REFORMATTING METHOD AND APPARATUS

CROSS-REFERENCE TO RELATED APPLICATIONS

This application is a continuation-in-part of U.S. patent application Ser. No. 08/263,572, filed Apr. 29, 1994, titled "Central Processing Unit with Integrated Graphics Functions," by Van Hook, Kohn, and Yung, which issued on Mar. 31, 1998 as U.S. Pat. No. 5,734,874.

FIELD OF THE INVENTION

The present invention relates to graphical image processing in a computer system and, in particular, to a particularly efficient mechanism for combining multiple separate bands of a graphical image into a single, multiple-band image buffer.

BACKGROUND OF THE INVENTION

In most computer graphics display devices in use today, color graphical images to be displayed must be in a 4-band, interleaved format in which four contiguous data components specify four respective components of a single pixel of the graphical image. For example, in some such devices, four contiguous bytes of data specify alpha, blue, green and red components, respectively, of a single pixel. It is also common to store a graphical image as multiple, separate pixel arrays for each component of which the graphical image is composed. For example, a color graphical image may be stored in the memory of a computer as three separate buffers, the first buffer including red components of the pixels of the graphical image, the second buffer including green components of the pixels of the graphical image, and the third buffer including blue components of the pixels of the graphical image.

To display a graphical image. each band of which is stored in a separate buffer, it is generally necessary to interleave the respective bands of the respective buffers into a single buffer of multiple-band pixels. For example. one such multiple-band pixel format is the general ABGR format which is generally alpha, blue, green, and red components of a single pixel stored as four respective, contiguous bytes. It is common for graphical images produced today to include approximately one million pixels. For example. common sizes for graphical images include rectangular grids of 1024-by-768 pixels or 1280-by-1024 pixels, i.e., 786,432 and 1,310,720 pixels, respectively. To produce from three separate buffers of respective bands of a graphical image a single buffer containing a four-band graphical image typically requires approximately three million read operations to read each component of each pixel from a respective one of the separate buffers and approximately four million write operations to store each band of each pixel in the single multiple-band buffer. Some conventional computer systems can store four (4) bytes in a single write operation and can therefore store approximately one million pixels in a single multiple-band buffer using, approximately one million write operations.

Because of the significant computer system resources required for such graphical image reformatting, a need persists in the industry for ever increasing) efficiency in conversion of graphical images from multiple buffers of respective single bands of the graphical image to a single buffer of multiple bands of the graphical image.

SUMMARY OF THE INVENTION

In accordance with the present invention. respective components of two or more multiple-band pixels are read from each of two or more single-band graphical image buffers, each of which includes components of a respective band of the multiple-band pixels. Two or more components of each band are stored in respective data words. For example, (i) two or more red components of two or more respective multiple-band pixels are read from a red buffer and are stored in a red data word, (ii) two or more green components of the two or more multiple-band pixels are read from a green buffer and are stored in a green data word. and (iii) two or more blue components of the two or more multiple-band pixels are read from a blue buffer and are stored in a blue data word. Data words, which include two or more components corresponding to each of first and third bands of two or more multiple-band pixels. are merged to form an interleaved data word in which respective components of the merged data words are interleaved. For example, if the first and third bands of the multiple-band pixels are alpha and green bands, respectively, the interleaved data word includes a component representing the alpha band of a first multiple-band pixel followed by a component representing the green band of the first multiple-band pixel followed by a component representing the alpha band of a second multiple-band pixel followed by a component representing the green band of the second multiple-band pixel, and so on. Data words, which include two or more components corresponding to each of second and fourth bands of the two or more multiple-band pixels, are merged to form a second interleaved data word in which respective components of the merged data words are interleaved. For example, if the second and fourth bands of the multiple-band pixels are blue and red bands, respectively, the second interleaved data word includes components representing the following in sequence the blue band of the first multiple-band pixel, the red band of the first multiple-band pixel, the blue band of the second multiple-band pixel, the red band of the second multiple-band pixel, and so on.

The first-mentioned interleaved data word and the second interleaved data word are then merged to form a third interleaved data word in which respective components of the first and second interleaved data words are interleaved with one another. Continuing in the above illustrative example, the third interleaved data word includes components representing the following in sequence: the alpha band of the first multiple-band pixel, the blue band of the first multiple-band pixel, the green band of the first multiple-band pixel, the red band of the first multiple-band pixel, the alpha band of the second multiple-band pixel, the blue band of the second multiple-band pixel, the green band of the second multiple-band pixel, the red band of the second multiple-band pixel, and so on. Therefore, the third interleaved data word includes two or more multiple-band pixels in the alpha, blue, green, red format.

In one embodiment, a single read operation reads eight components from each of three buffers which correspond to red, green and blue bands, respectively, of a multiple-band graphical image. Of the eight components of each band read using(the single read operation, four components of each band are merged to form four multiple-band pixels simultaneously. A single merge operation merges eight components representing alpha and green bands of four multiple-band pixels, and a single merge operation merges eight components representing blue and red bands of the four multiple-band pixels. Two additional merge operations merge the merged data words to form four multiple-band pixels, each of which includes alpha, blue, green, and red components. Eight multiple-band pixels, each of which is four bytes in length, are written to a destination buffer in four write operations. Thus, to convert eight pixels from single-band format to multiple-band format, e.g., alpha, blue, green, and red format, requires three read operations, eight merge operations, and four write operations, i.e., a total of fifteen operations. Using prior art techniques, such format conversion of three components of each of eight pixels to eight multiple-band pixels typically requires eight read operations for each band, i.e., twenty-four read operations, and thirty-two write operations which total fifty-six operations. In addition, each component is typically moved individually into an interleaved, multiple-band format in a separate assignment operation. Thus, thirty-two assignment operations are required as well, bringing the total number of required operations to eighty-eight. As a result, the present invention represents a significant reduction of the required processing resources to convert single-band pixel components to multiple-band pixels over prior art techniques.

DETAILED DESCRIPTION

In accordance with the present invention, components of multiple-band pixels are read from multiple single-band pixel component butters and are merged to form multiple-band pixels in an interleaved format substantially simultaneously.

Hardware Components of the Image Processing System

To facilitate appreciation of the present invention, the hardware components of the graphical image reformatting system are briefly described. Computer system 100 (FIG. 1) includes a processor 102 and memory 104 which is coupled to processor 102 through a bus 106. Processor 102 fetches from memory 104 computer instructions and executes the fetched computer instructions. Processor 102 also reads data from and writes data to memory 104 and sends data and control signals through bus 106 to one or more computer display devices 120 in accordance with fetched and executed computer instructions. Processor 102 is described in greater detail below.

Figure 1:
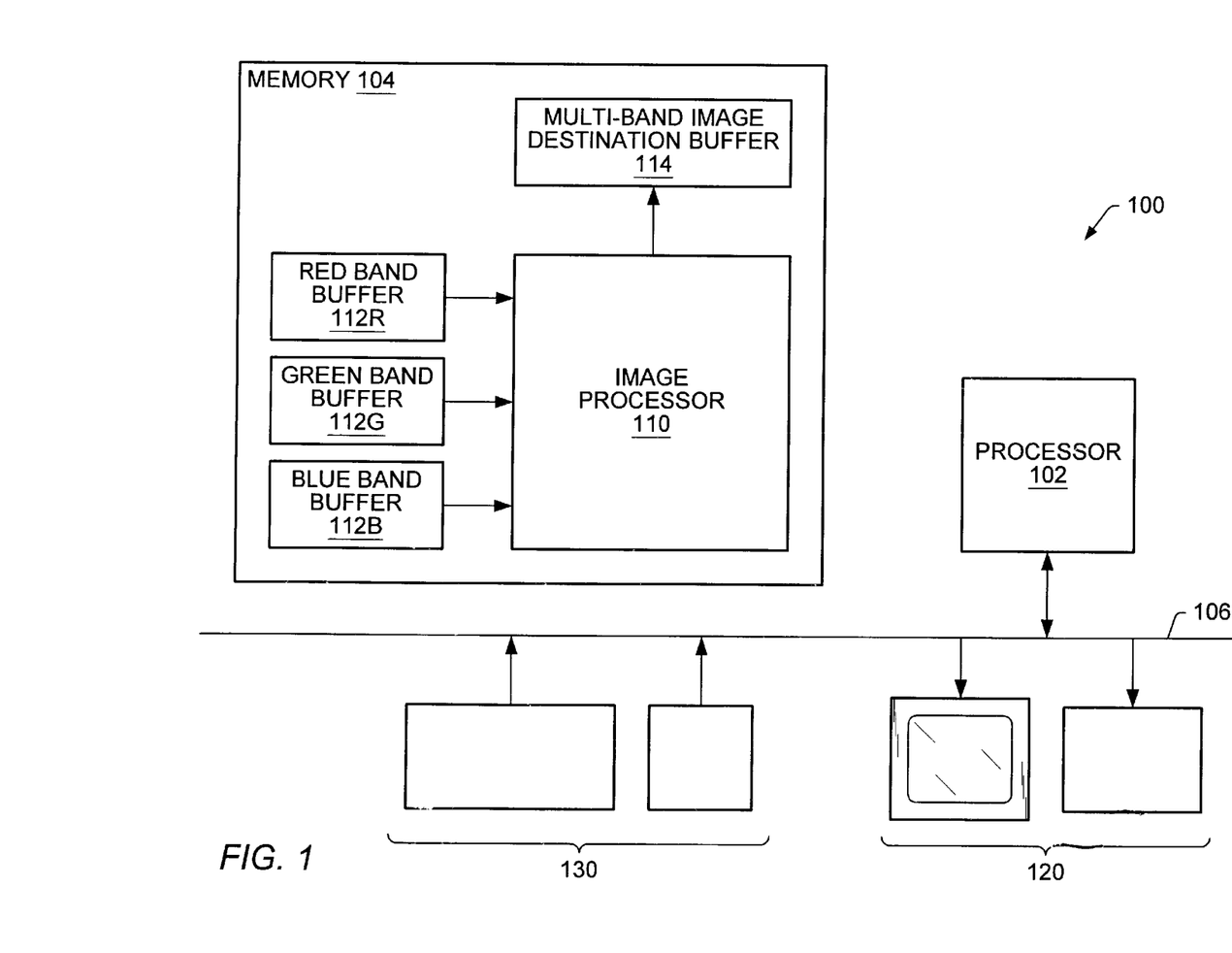
FIG. 1 is a block diagram of a computer system which includes an image processor which builds from separate, single-band pixel component buffers a multiple-band pixel buffer in accordance with the present invention.

Memory 104 can include any type of computer memory and can include, without limitation, randomly accessible memory (RAM), read-only memory (ROM), and storage devices which include storage media such as magnetic and/or optical disks. Memory 104 includes an image processor 110, which is a computer process executing within processor 102 from memory 104. A computer process is a collection of computer instructions and data which collectively define a task performed by computer system 100. As described more completely below, image processor 110 (i) reads red, green, and blue components of pixels from buffers 112R, 112G, and 112B, respectively, (ii) combines those components to form multiple-band pixels, and (iii) stores those multiple-band pixels in destination buffer 114.

Buffers 112R, 112G, and 112B and destination buffer 114 are stored in memory 104. Buffers 112R, 112G, and 112B each store data representing individual bands of the same pixels. For example, buffers 112R, 112G, and 112B store red, green, and blue components, respectively, of the same pixels. In other words, if a particular component of data at a particular location within buffer 112R represents a red band of a particular pixel, the particular component of data at the same location within buffers 112G and 112B represent green and blue bands, respectively, of the same pixel. Therefore, buffers 112R, 112G, and 112B collectively represent a single collection of multiple-band pixels.

Destination buffer 114 can be any graphical image buffer used in graphical image processing. For example, destination buffer 114 can be a Z buffer which is used in a conventional manner to remove hidden surfaces from a rendered graphical image. Alternatively, destination buffer 114 can be a frame buffer whose contents are immediately displayed in one of computer display devices 120. Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

Figure 2:
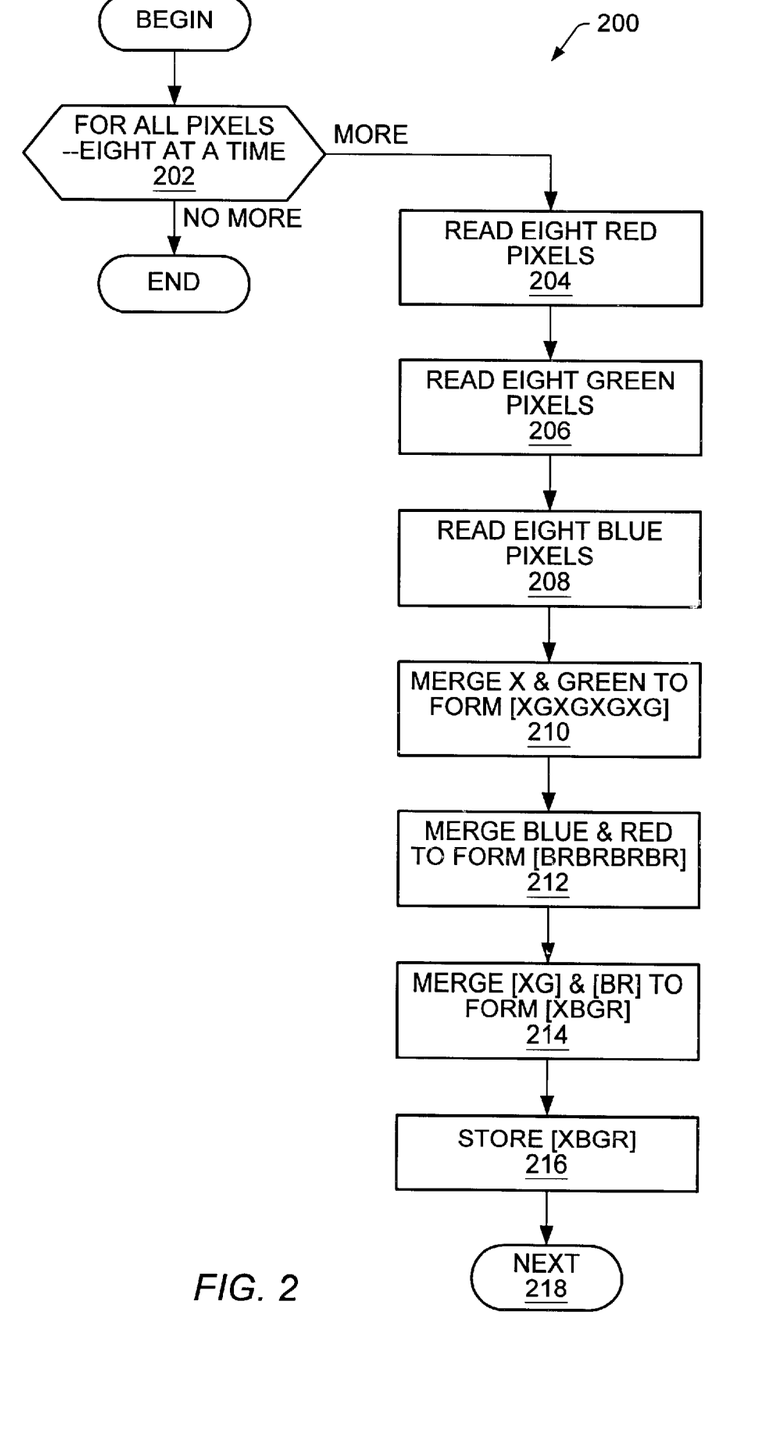
FIG. 2 is a logic flow diagram illustrating the construction of a multiple-band pixel buffer from separate, single-band pixel component buffers by the image processor of FIG. 1 in accordance with the present invention.

The construction from multiple single-band buffers 112R, 112G, and 112B of multiple-band destination buffer 114 by image processor 110 is illustrated as logic flow diagram 200 (FIG. 2). Processing according to logic flow diagram 200 begins with loop step 202. Loop step 202 and next step 218 define a loop in which image processor 110 (FIG. 1) processes all of the components of buffers 112R, 112G, and 112G according to steps 204–216. Eight of the multiple-band pixels represented collectively by buffers 112R, 112G, and 112B are processed in a single iteration of the loop defined by loop step 202 and next step 218. For each eight of the multiple-band pixels, processing transfers from loop step 902 to step 204.

In step 204, image processor 110 (FIG. 1) reads eight components from buffer 112R in a single read operation. Processor 102 performs a read operation in which sixteen contiguous bytes of data can be read from memory 104. Image processor 110 invokes the read operation and causes processor 102 to perform a data alignment operation which shifts the read data such that the byte representing the first of the eight components of buffer 112R to be processed according to the current iteration of the loop defined by loop step 202 (FIG. 2) and next 218 is aligned on an eight-byte boundary. In a preferred embodiment, image processor 110 (FIG. 1) determines whether the sixteen bytes of data read in step 204 (FIG. 2) are already aligned on an eight-byte boundary prior performing the data alignment operation. If the sixteen bytes of data are already so aligned, image processor 110 (FIG. 1) does not performs the data alignment operation.

In this illustrative embodiment, each component of buffers 112R, 112G, and 112B which represents a band of a pixel is a single byte. While data representing eight pixels are retrieved substantially simultaneously, data representing four pixels are converted from single-band format to multiple-band format substantially simultaneous. Thus, four contiguous bytes representing respective pixel components from buffer 112R are stored in data word 312 (FIG. 3) of image processor 110 (FIG. 1). Data word 312 (FIG. 3) includes four partitioned bytes R0–3 which represent respective ones of the first Four components read from buffer 112R. Image processor 110 (FIG. 1) similarly includes in four partitioned bytes of a data word the second four components read from buffer 112R in a directly analogous manner. Processing transfers from step 204 (FIG. 2) to step 206.

In step 206, image processor 110 (FIG. 1) reads eight components from buffer 112G in a single read operation and aligns the read data and stores the first four components in data word 304 (FIG. 3) of image processor 110 (FIG. 1) in a manner which is directly analogous to that described above with respect to step 204. Data word 304 is directly analogous to data word 312 and includes four partitioned bytes G0–3 which correspond to, i.e., represent bands of the same pixels as the pixels whose bands are also represented by, bytes R0–3. Processing transfers from step 206 (FIG. 2) to step 208.

In step 208, image processor 110 (FIG. 1 ) reads eight components from buffer 112B in a single read operations and aligns the read data and stores the first four components in data word 310 (FIG. 3) of image processor 110 (FIG. 1) in a manner which is directly analogous to that described above with respect to step 204. Data word 310 is directly analogous to data words 312 and 304 and includes four partitioned bytes B0–3 which correspond to, i.e., represent bands of the same pixels as the pixels whose bands are also represented by, bytes R0–3. Processing transfers from step 208 (FIG. 2) to step 210.

In this illustrative embodiment, image processor 110 (FIG. 1) reads components from buffers representing red, green, and blue bands of the pixels of a graphical image and stores pixels having four bands in destination butter 114. Therefore image processor 110 includes a data word 302 which includes four partitioned bytes X0–3 which represent the fourth band of four respective pixels and are initialized to have values of zero. In an alternative embodiment, bytes X0–3 are read from a fourth single-band buffer in the manner described above.

Figure 3:
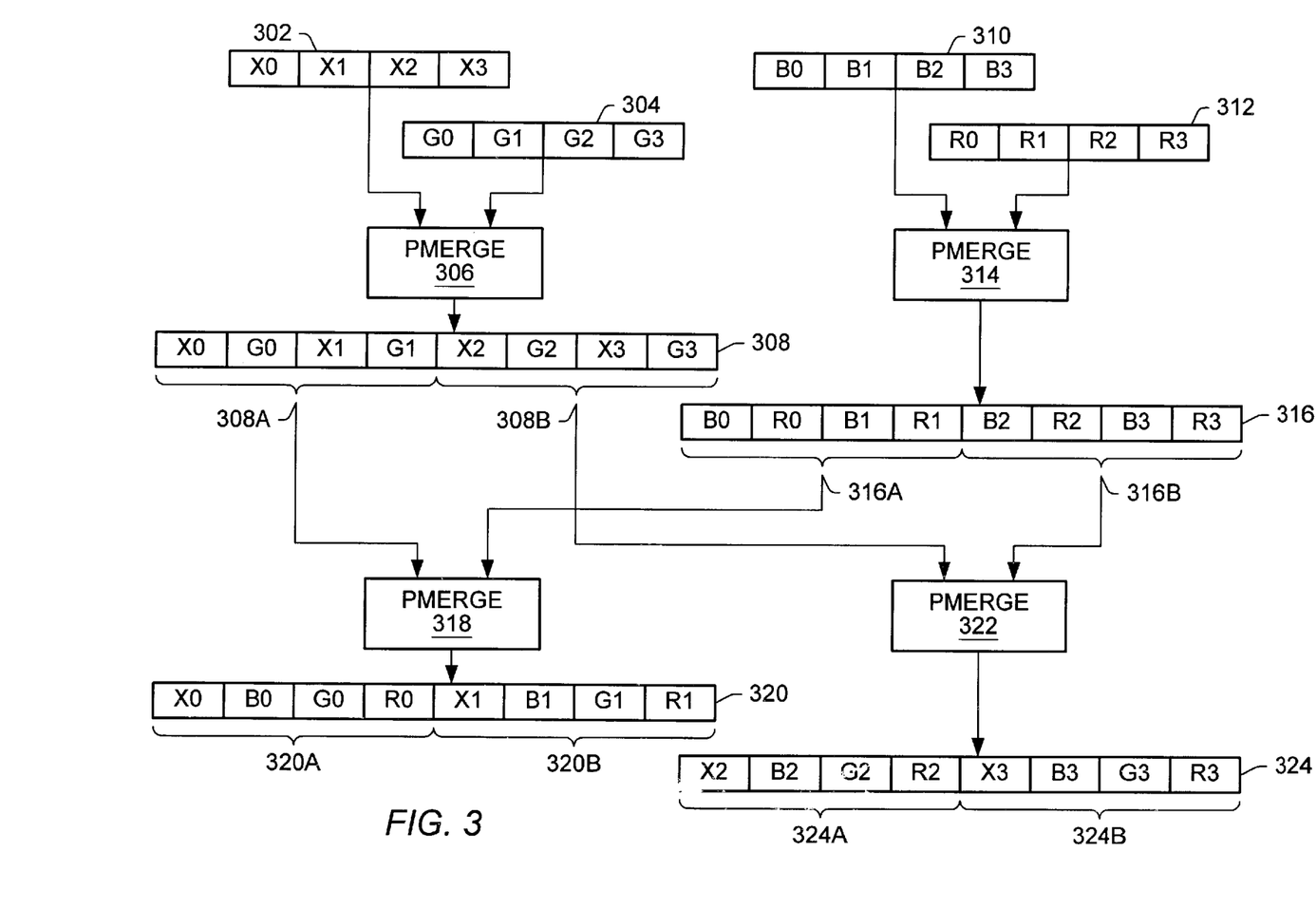
FIG. 3 is a block diagram illustrating merge operations used by the image processor of FIG. 1 to construct from single-band pixel component buffers a multiple-band pixel buffer in accordance with the present invention.
Figure 4:
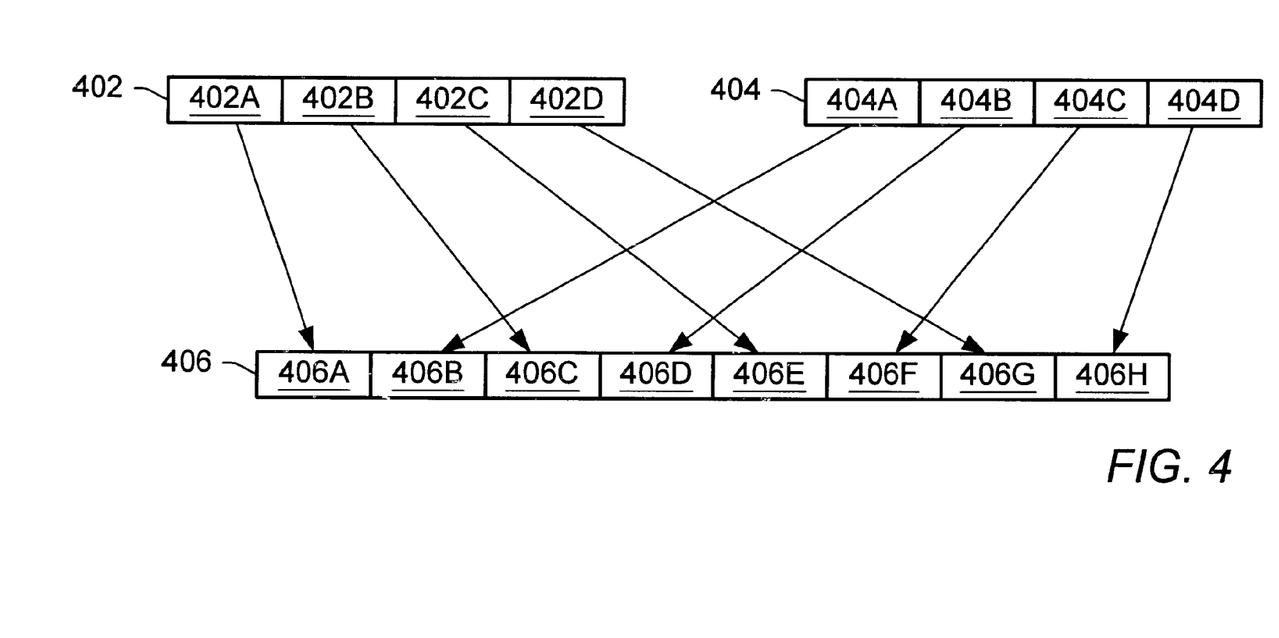
FIG. 4 is a block diagram illustrating a merge operation performed by a computer processor of FIG. 1.

In step 210 (FIG. 2), image processor 110 merges bytes X0–3 and bytes G0–3 using a PMERGE operation 306 which is performed by processor 102 (FIG. 1) and is illustrated in FIG. 4. Data word 402 is 32-bits in length and includes four partitioned bytes 402A–D. Similarly, data word 404 is 32-bits in length and includes four partitioned bytes 404A–D. The PMERGE operation interleaves respective bytes of data words 402 and 404 into a double data word 406 as shown. Double data word 406 is 64 bits in length and includes eight partitioned bytes 406A–H. The result of PMERGE operation 306 (FIG. 3) is double data word 308 which is 64-bits in length and whose eight partitioned bytes have the following values: X0, G0, X1, G1, X2, G2, X3, and G3. Image processor 110 merges the second four bytes read from buffer 112G with bytes X0–3 in a directly analogous manner. Processing transfers from step 210 (FIG. 2) to step 212.

In step 212, image processor 110 (FIG. 1) merges bytes B0–3 (FIG. 3) and R0–3 using a PMERGE operation 314, which is directly analogous to PMERGE operation 306 described above. The result of PMERGE operation 114 is double data word 316 which is 64-bits in length and whose eight partitioned bytes have the following values: B0, R0, B1, R1, B2, R2, B3, and R3. Image processor 110 (FIG. 1) also merges the second four bytes read from buffer 112B with the second four bytes read from buffer 112R in a directly analogous manner. Processing transfers from step 212 (FIG. 2) to step 214.

In step 214, image processor 110 (FIG. 1) merges data words 308 (FIG. 3) and 316 using PMERGE operations 318 and 322. Specifically, image processor 110 (FIG. 1) merges the upper halves 308A (FIG. 3) and 316A of data words 308 and 316, respectively, using PMERGE operation 318 to form double data word 320. PMERGF operation 318 is directly analogous to PMERGE operations 308 and 316 described above. Double data word 320 is a 64-bit data word which includes eight partitioned bytes whose respective values are those of bytes X0, B0, G0. R0, X1, B1, G1, and R1, respectively. Therefore, upper half 320A of double data word 320 includes bytes X0, B0, G0, and R0, which collectively represent a single four-band pixel in alpha, blue, green, and red format. Similarly, lower half 320B double data word 320 includes bytes X1, B1, G1, and R1, which collectively represent another single four-band pixel in alpha, blue, green, and red format.

In an analogous manner, image processor 110 (FIG. 1) merges lower halves 308B (FIG. 3) and 316B of double data words 308 and 316. respectively, using PMERGE operation 322 to form double data word 324. PMERGE operation 322 is directly analogous to PMERGE operations 306, 314, and 318 described above. Double data word 324 is a 64-bit data word which includes eight partitioned bytes whose respective values are those of bytes X2, B2, G2, R2, X3, B3, G3, and R3, respectively. Therefore, upper half 324A of double data word 324 includes bytes X2, B2, G2, and R2, which collectively represent a third single four-band pixel in alpha, blue, green, and red format. Similarly, lower half 324B of double data word 324 includes bytes X3, B3, G3, and R3, which collectively represent a fourth single four-band pixel in alpha, blue, green, and red format.

In a manner which is directly analogous to that described above with respect to FIG. 3, image processor 110 (FIG. 1) merges the second four bytes read from each of buffers 112B, 112G, and 112R to represent four more pixels in alpha, blue, green, and red format.

Processing transfers from step 214 (FIG. 2) to step 216 in which image processor 110 (FIG. 1) stores data representing the eight pixels in alpha, blue, green, and red format, including data words 320 (FIG. 3) and 324, in destination buffer 114 in a single write operation. As described above, storage of pixels in destination buffer 114 can result immediately or indirectly in display of such pixels in one or more of computer display devices 120. From step 216 (FIG. 2). processing transfers through next step 218 to loop step 202 in which the next eight pixels represented by buffers 112R, 112G, and 112B collectively are processed according to steps 204–216. Once all pixels represented by buffers 112R, 112G, and 112B collectively have been processed according to the loop of loop step 202 and next step 218, processing according to logic flow diagram 200 completes.

While it is generally described that all pixels represented by buffers 112R (FIG. 1), 112G, and 112B collectively are processed, eight pixels per iteration of the loop of loop step 202 (FIG. 2) and next step 216, some buffers do not necessarily store pixels of sequential scanlines contiguously. Therefore, in a preferred embodiment, image processor 110 (FIG. 1) processes in each iteration of the loop of loop step 202 (FIG. 2) and next step 218 eight pixels of a particular scanline represented by buffers 112R, 112G, and 112B collectively. In this preferred embodiment, image processor 110 (FIG. 1) processes each scanline of buffers 112R, 112G, and 112B in sequence.

It is appreciated that scanlines of a particular graphical image represented by buffers 112R, 112G, and 112B sometimes has a number of pixels which is not evenly divisible by eight. In such circumstances, image processor 110 processes one, two, three, four, five, six, or seven pixels represented by buffers 112R, 112G, and 112B collectively in the manner described above with respect to steps 204–216 while ignoring, excess bates of double data words 302, 304, 310, 312, 320, and 324. For example, if scanlines of a graphical image represented by buffers 112R, 112B, and 112G include a number of pixels which is one more than an integer multiple of eight, one pixel represented by buffers 112R, 112G, and 112B is processed in the following manner for each scanline of buffers 112R, 112G, and 112B.

Image processor 110 reads one pixel from each of buffers 112R, 112G, and 112B and stores the read byte at the upper byte of each of data words 312 (FIG. 3), 310, and 304, respectively, i.e., as bytes R0, G0, and B0, respectively. Data word 302 is set as described above and is not modified throughout processing according to logic flow diagram 200 (FIG. 2). Bytes R1 (FIG. 3), R2, R3, G1, G2, G3, B1, B2, and B3 are ignored. PMERGE operations 306, 314, 318, and 322 are executed in the manner described above. As a result, bytes X0, B0, G0, and R0 are in upper half 320A of data word 320 and are stored in destination buffer 114 (FIG. 1) by image processor 110. Lower half 320B (FIG. 3) of data word 320 and both halves of data word 324 are ignored.

FIG. 3 also illustrates merging of components of multiple-band pixels in a multiple-band format to separate each respective band of the multiple-band pixels into separate single bands Such is illustrated, for example, by the following, example. Data word 302 includes bytes X0, X1, X2, and X3 which represent alpha, blue. green, and red components, respectively, of a single pixel. In a directly analogous manner, respective bands of second, third, and fourth pixels are presented by respective bytes of data words 310, 304, and 312. Thus, bytes X0, B0, G0, and R0 represent alpha components of first, second, third, and fourth pixels, respectively. Similarly, (i) bytes X1, B1, G1, and R1 represent blue components of first, second, third, and fourth pixels, respectively; (ii) bytes X2, B2, G2, and R2 represent preen components of first, second, third, and fourth pixels, respectively; and (iii) bytes X3, B3, G3, and R3 represent red components of first, second, third, and fourth pixels, respectively. By operation of PMERGE operations 306, 314, 318, and 322 in the manner described above, data word 320A includes alpha components of the four pixels, data word 320B includes blue components of the four pixels, data word 324A includes green components of the four pixels, and data word 324B includes red components of the four pixels.

Processor 102

Figure 5:
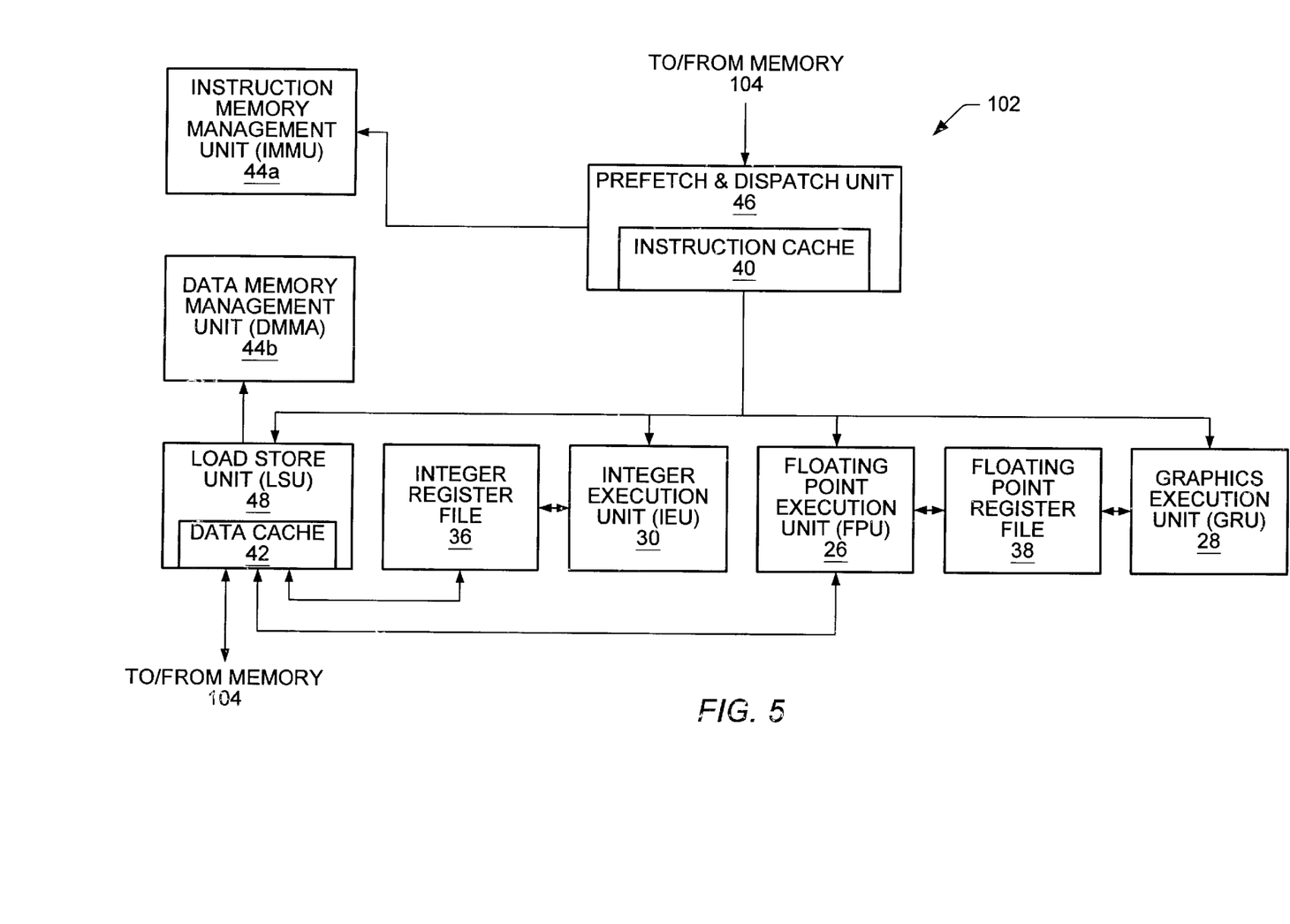
FIG. 5 is a block diagram of the computer processor of FIG. 1 in greater detail.

Processor 102 is shown in greater detail in FIG. 5 and is described briefly herein and more completely in U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) which is incorporated in its entirety herein by reference. Processor 102 includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown Additionally, processor 102 includes two memory management units (IMMU & DMMU) 44a–44b, and a load and store unit (LSU) 48, which in turn includes data cache 120, coupled to each other and the previously described elements as shown. Together, the components of processor 102 fetch, dispatch, execute, and save execution results of computer instructions, e.g., computer instructions of image processor 110 (FIG. 1), in a pipelined manner.

PDU 46 (FIG. 5) fetches instructions from memory 104 (FIG. 1) and dispatches the instructions to IEU 30 (FIG. 5), FPU 26, GRU 28, and LSU 48 accordingly. Prefetched instructions are stored in instruction cache 40. IEU 30, FPU 26, and GRU 28 perform integer, floating, point, and graphics operations, respectively. In general, the integer operands and results are stored in integer register file 36, whereas the floating point and graphics operands and results are stored in floating point register file 38. Additionally IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a–44b map virtual addresses to physical addresses.

PDU 46, IEU 30, FPU 26, integer and floating point resister files 36 and 38, MMUs 44a–44b, and LSU 48 can be coupled to one another in any of a number of configurations as described more completely in the '572 application. As described more completely in the '572 application with respect to FIGS. 8a–8d thereof, (IRU 28 performs a number of distinct partitioned multiplication operations and partitioned addition operations. Various partitioned operations used by image processor 110 (FIG. 1) are described more completely below.

As described above, processor 102 includes four (4) separate processing units, i.e., LSU 48, IEU 30, FPU 26, and GRU 28. Each of these processing units is described more completely in the '572 application. These processing units operate in parallel and can each execute a respective computer instruction while others of the processing units executes a different computer instruction. GRU 28 executes the merge operations described above.

In one embodiment, processor 102 is the UltraSPARC processor available from SPARC International, Inc., and computer system 100 (FIG. 1) is the UltraSPARCstation available from Sun Microsystems, Inc. of Mountain View, Calif. Sun, Sun Microsystems and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

The above description is illustrative only and is not limiting. The present invention is limited only by the claims which follow

What is claimed is:

1. A method for constructing multiple-band pixels from two or more single-band pixels, the method comprising:
   (a) receiving a plurality of single-band pixels;
   (b) storing the single-band pixels in separate buffers;
   (c) receiving a merge instruction, and in response thereto:
      (i) reading pixel components from each of the separate buffers;
      (ii) merging the pixel components to form double-band data words;

(iii) repeating the merging to one or more times to form N-band data words,
wherein N is a positive integer power of two; and
(iv) storing the N-band data word into a multiple-band buffer.

2. The method as recited in claim 1, wherein the pixel components include color.

3. The method as recited in claim 1, wherein the pixel components are red, green, blue, and alpha.

4. The method as recited in claim 1, wherein N equals 4.

5. The method as recited in claim 1, wherein the single-band pixels are each 8 bytes long, and wherein the N-band data word is 32 bytes long.

6. The method as recited in claim 1, wherein each of the double-band data words is an interleaved data word of two-band pixels in which respective pixel components of two bands are interleaved, wherein each of the N-band data words is an interleaved data word of N-band pixels in which respective pixel components of N bands are interleaved.

7. The method as recited in claim 1, wherein the method is configured to be performed by a processor in response to the processor receiving a pixel merge instruction.

8. The method as recited in claim 1, wherein a processor is configured to perform (ii) in response to receiving a first pixel merge instruction, wherein the processor is configured to perform (iii) in response to receiving a second pixel merge instruction.

9. A graphics system comprising:
a plurality of buffers, wherein a subset of the buffers are each configured to store data corresponding to one pixel component for a plurality of pixels, wherein at least one of the buffers is configured to store data corresponding to multiple pixel components for one or more pixels;
a processor coupled to the plurality of single-band buffers, wherein the processor is configured to execute a pixel merge instruction by:
(a) reading pixel components from the subset of buffers configured to store data corresponding to one pixel component,
(b) merging the pixels components to form one or more double-band data words,
(c) merging the dual-band data words to form a quad-band data word, and
(d) storing the quad-band data word to the at least one buffer configured to store data corresponding to multiple pixel components.

10. The system of claim 9, wherein the pixel components include red, green, blue, and alpha.

11. The system of claim 9, wherein the processor is configured to read 8 bytes for (a).

12. The system of claim 11, wherein each 8 bytes corresponds to four pixels.

13. The system of claim 11, wherein the double-band data words are each 16 bytes long, wherein the quad-band data word is 32 bytes long, and wherein the quad-band data word corresponds to 8 pixels.

14. The system of claim 9, wherein each 8 bytes corresponds to four pixels.

15. The system of claim 14, wherein the first and second double-band data words are each 16 bytes long, wherein the quad-band data word is 32 bytes long, and wherein the quad-band data word corresponds to 8 pixels.

16. A graphics system comprising:
a first buffer configurable to store a first pixel component for a plurality of pixels;
a second buffer configurable to store a second pixel component for the plurality of pixels;
a third buffer configurable to store a third pixel component for the plurality of pixels;
a fourth buffer configurable to store a fourth pixel component for the plurality of pixels; and
a processor coupled to the first, second, third, and fourth buffers, wherein the processor is configured to execute a pixel merge instruction by:
(a) reading two or more of the first pixel components from the first buffer,
(b) reading two or more of the second pixel components from the second buffer,
(c) merging the first and second pixel components to form a first double-band data word;
(d) reading two or more of the third pixel components from the third buffer,
(e) reading two or more of the fourth pixel components from the fourth buffer,
(f) merging the first and second pixel components to form a second double-band data word; and
(g) merging the first and second double-band data words to form a quad-band data word.

17. The system of claim 16, wherein the first, second, third and fourth pixel components are one of the following: red, green, blue, and alpha.

18. The system of claim 16, further comprising a multi-band destination buffer configured to store the quad-band data word from the processor.

19. The system of claim 16, wherein the processor is an image processor.

20. The system of claim 16, wherein the processor is configured to store the first double-band data word to a first storage buffer, wherein the processor is configured to store the second double-band data word to a second storage buffer, and wherein the processor is configured to.

21. The system of claim 16, wherein the processor is configured to read 8 bytes for each of (a), (b), (d), and (e).

* * * * *

UNITED STATES PATENT AND TRADEMARK OFFICE
CERTIFICATE OF CORRECTION

PATENT NO. : 6,396,504 B1
APPLICATION NO. : 08/674278
DATED : May 28, 2002
INVENTOR(S) : Yung et al.

Page 1 of 1

It is certified that error appears in the above-identified patent and that said Letters Patent is hereby corrected as shown below:

In the Claims:

Column 9
Line 1, please delete "(iii) repeating the merging to one or more times" and substitute -- (iii) repeating the merging one or more times --;

Column 9
Line 43, please delete "(c) merging the dual-band data words" and substitute -- (c) merging the double-band data words --;

Column 10
Line 33, please delete "merging the first and second pixel components" and substitute -- merging the third and fourth pixel components --;

Column 10
Lines 48 - 49, please delete "the second double-band data word to a second storage buffer, and wherein the processor is configured to" and substitute -- the second double-band data word to a second storage buffer. --.

Signed and Sealed this

First Day of April, 2008

JON W. DUDAS
*Director of the United States Patent and Trademark Office*